(12) United States Patent
Jones et al.

(10) Patent No.: US 9,141,715 B2
(45) Date of Patent: Sep. 22, 2015

(54) AUTOMATED HYPERLINKING IN ELECTRONIC COMMUNICATION

(75) Inventors: Andrew R. Jones, Round Rock, TX (US); Brian M. O'Connell, Research Triangle Park, NC (US); Anne R. Sand, Peyton, CO (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 13/342,311

(22) Filed: Jan. 3, 2012

(65) Prior Publication Data

US 2013/0174002 A1 Jul. 4, 2013

(51) Int. Cl.
*G06F 17/20* (2006.01)
*G06F 17/30* (2006.01)
*G06F 17/22* (2006.01)

(52) U.S. Cl.
CPC ...... *G06F 17/30882* (2013.01); *G06F 17/2247* (2013.01)

(58) Field of Classification Search
CPC .................................................. G06F 17/2235
USPC .................................................. 715/205–208
See application file for complete search history.

(56) References Cited

U.S. PATENT DOCUMENTS

| 5,819,261 | A | 10/1998 | Takahashi et al. | |
|---|---|---|---|---|
| 8,346,623 | B2 * | 1/2013 | Olexa | 705/26.61 |
| 8,751,295 | B2 * | 6/2014 | Tiku et al. | 705/14.17 |
| 8,788,324 | B1 * | 7/2014 | Shetty et al. | 705/14.1 |
| 8,849,699 | B2 * | 9/2014 | Durvasula et al. | 705/14.49 |
| 8,868,444 | B2 * | 10/2014 | Morris et al. | 705/14.12 |
| 2003/0208472 | A1 * | 11/2003 | Pham | 707/2 |
| 2003/0237044 | A1 | 12/2003 | Hayer et al. | |
| 2005/0289113 | A1 * | 12/2005 | Bookstaff | 707/1 |
| 2005/0289446 | A1 * | 12/2005 | Moncsko et al. | 715/501.1 |
| 2006/0184566 | A1 | 8/2006 | Lo et al. | |
| 2007/0022167 | A1 * | 1/2007 | Citron | 709/206 |

(Continued)

FOREIGN PATENT DOCUMENTS

JP 2007-265420 A 10/2007

OTHER PUBLICATIONS

"Automatically Replace Defined Keywords with Affiliate Links", http://www.webmastercrunch.com/automatically-replace-defined-keywords-with-affiliate-links/, printed Sep. 15, 2011, 6 pages.

(Continued)

*Primary Examiner* — Cesar Paula
*Assistant Examiner* — Mohammed-Ibrahim Zuberi
(74) *Attorney, Agent, or Firm* — Francis Lammes; Stephen J. Walder, Jr.; Mark C. Vallone

(57) ABSTRACT

In a method for automated hyperlinking, a computer receives user input specifying a set of character sequence columns in a table to use for character sequence comparison. The computer detects whether a character sequence entered into an electronic communication in a user interface on a display matches one or more character sequences in fields of the set of character sequence columns. Responsive to the character sequence matching a single character sequence of the one or more character sequences in the fields of the set of character sequence columns, the computer retrieves, from an associated link field in the table, a hyperlink associated with the single character sequence. The computer inserts the hyperlink into the electronic communication.

18 Claims, 4 Drawing Sheets

(56) References Cited

U.S. PATENT DOCUMENTS

| | | | |
|---|---|---|---|
| 2009/0210787 A1* | 8/2009 | Tamura | 715/255 |
| 2010/0131840 A1* | 5/2010 | Walker et al. | 715/234 |
| 2010/0251086 A1* | 9/2010 | Haumont et al. | 715/205 |
| 2012/0151310 A1* | 6/2012 | El-kalliny | 715/205 |
| 2013/0145241 A1* | 6/2013 | Salama | 715/202 |

OTHER PUBLICATIONS

"Convert DB text to links", http://www.visualbasicscript.com/Convert-DB-text-to-links-m52420.aspx, printed Sep. 2, 2011, 7 pages.

"Discover How to Automatically Convert Keywords on Your Blog Into Money-Making Affiliate Links in Mere Seconds—Autopilot Blogging Has Never Been Easier!", http://mbpninjaaffiliate.com/index-2.php, printed Sep. 15, 2011, 11 pages.

"Hyperlink", http://en.wikipedia.org/wiki/Hyperlink, printed Sep. 15, 2011, 6 pages.

"Scan a string and replace tags with links", http://stackoverflow.com/questions/5889873/scan-a-string-and-replace-tags-with-links, printed Aug. 5, 2011, 4 pages.

Solc, Tomaz, "Automatic generation of in-text hyperlinks in web publishing", http://www.tablix.org/~avian/blog/papers/generation_of_intext_hyperlinks.pdf, May 2008, 4 pages.

* cited by examiner

| DOCUMENT IDENTIFIER | DOCUMENT TITLE | DOCUMENT AUTHOR | ASSOCIATED LINK |
|---|---|---|---|
| 01 | WebSphere User Manual | IBM | Server=DOB23L Path=/w_dir/wsusermanual.pdf |
| 02 | WebSphere Product Listing | IBM | /p_dir/products.xls |
| 03 | WebSphere Redbook 6.1 | IBM | http://www.redbooks.ibm.com/abstracts/sg247611.html |
| 04 | WebSphere Redbook 7.0 | IBM | http://www.redbooks.ibm.com/abstracts/sg247583.html |
| 05 | The Midnight Ride of Paul revere | Henry Wadsworth Longfellow | http://www.nationalcenter.org/PaulRevere'sRide.html |
| 06 | Gettysburg Address | Abraham Lincoln | http://www.usconstitution.net/getty.html |

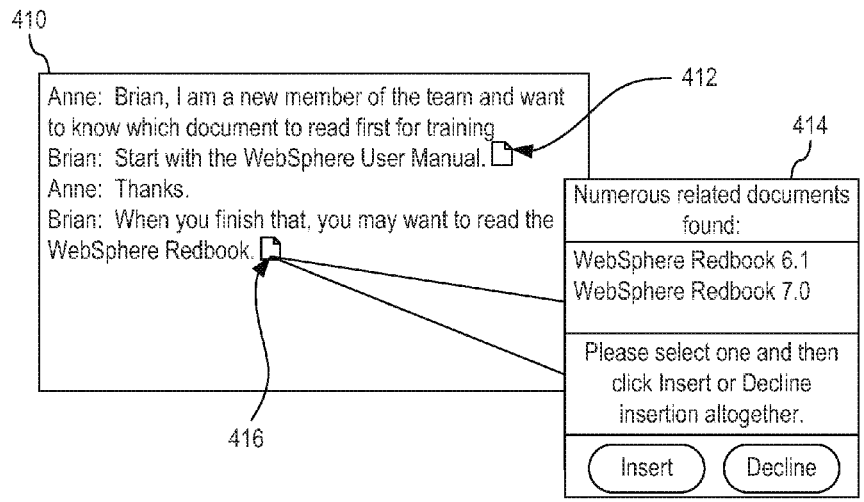

FIG. 4

AUTOMATED HYPERLINKING IN ELECTRONIC COMMUNICATION

TECHNICAL FIELD

The present application relates generally to an improved data processing apparatus and method and more specifically to an improved data processing apparatus and method for database field extraction for contextual collaboration.

BACKGROUND

In computing, a hyperlink (or link) is a reference to a document that a reader may directly follow, or that is followed automatically. A hyperlink points to a whole document or to a specific element within a document. Hypertext is text with hyperlinks. A software system for viewing and creating hypertext is a hypertext system, and to create a hyperlink is to hyperlink (or simply to link). A user following hyperlinks is said to navigate or browse the hypertext. A hyperlink has an anchor, which is the location within a document from which the hyperlink may be followed; the document containing, a hyperlink is known as its source document. The target of a hyperlink is the document, or location within a document, to which the hyperlink leads. Users may activate and follow the link when its anchor is shown; usually by touching or clicking on the anchor with a pointing device. Following the link has the effect of displaying its target, often with its context.

SUMMARY

In one illustrative embodiment, a method, in a computer, is provided for automated hyperlinking. The method comprises a computer receiving user input specifying a set of character sequence columns in a table to use for character sequence comparison. The method further comprises the computer detecting whether a character sequence entered into an electronic communication in a user interface on a display matches one or more character sequences in fields of the set of character sequence columns. The method further comprises, responsive to the character sequence matching a single character sequence of the one or more character sequences in the fields of the set of character sequence columns, the computer retrieving, from an associated link field in the table, a hyperlink associated with the single character sequence. The method further comprises the computer inserting the hyperlink into the electronic communication.

In another illustrative embodiment, a computer program product for automated hyperlinking is provided. The computer program product comprises one or more computer-readable storage devices and program instructions, stored on at least one of the one or more computer-readable tangible storage devices, to receive user input specifying a set of character sequence columns in a table to use for character sequence comparison. The computer program product further comprises program instructions, stored on at least one of the one or more computer-readable tangible storage devices, to detect whether a character sequence entered into an electronic communication in a user interface on a display matches one or more character sequences in fields of the set of character sequence columns. Still further, the computer program product comprises program instructions, stored on at least one of the one or more computer-readable tangible storage devices, to, responsive to the character sequence matching a single character sequence of the one or more character sequences in the fields of the set of character sequence columns, retrieve, from an associated link field in the table, a hyperlink associated with the single character sequence. Moreover, the computer program product comprises program instructions, stored on at least one of the one or more computer-readable tangible storage devices, to insert the hyperlink into the electronic communication.

In yet another illustrative embodiment a computer system for automated hyperlinking is provided. The computer system comprises one or more processors, one or more computer-readable memories, and one or more computer-readable tangible storage devices. The computer system further comprises program instructions, stored on at least one of the one or more computer-readable tangible storage devices for execution by at least one of the one or more processors via at least one of the one or more memories, to receive user input specifying a set of character sequence columns in a table to use for character sequence comparison. Still further, the computer system comprises program instructions, stored on at least one of the one or more computer-readable tangible storage devices for execution by at least one of the one or more processors via at least one of the one or more memories, to detect whether a character sequence entered into an electronic communication in a user interface on a display matches one or more character sequences in fields of the set of character sequence columns. In addition, the computer system comprises program instructions, stored on at least one of the one or more computer-readable tangible storage devices for execution by at least one of the one or more processors via at least one of the one or more memories, to, responsive to the character sequence matching a single character sequence of the one or more character sequences in the fields of the set of character sequence columns, retrieve, from an associated link field in the table, a hyperlink associated with the single character sequence. Moreover, the computer system comprises program instructions, stored on at least one of the one or more computer-readable tangible storage devices for execution by at least one of the one or more processors via at least one of the one or more memories, to insert the hyperlink into the electronic communication.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts an exemplary scenario of the use of an automated hyperlink program in accordance with an illustrative embodiment.

DETAILED DESCRIPTION

Figure 1:
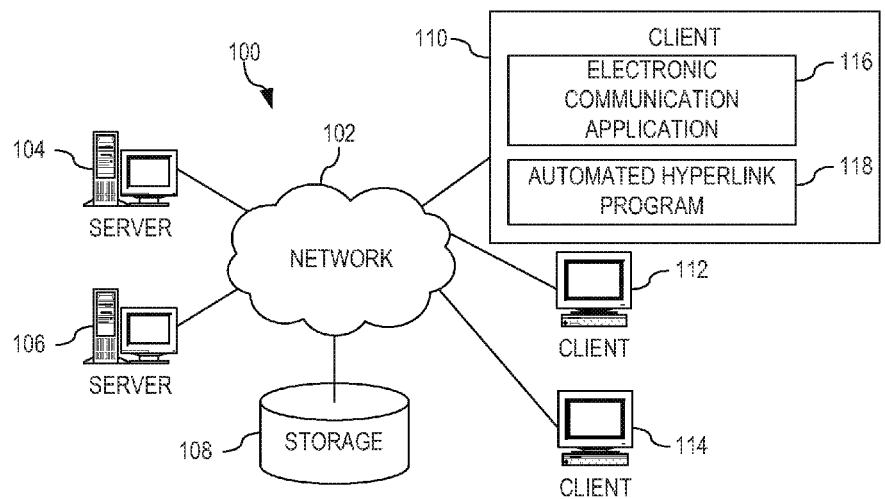
FIG. 1 depicts a pictorial representation of an example distributed data processing system in which aspects of the illustrative embodiments may be implemented.

Currently, when a user wants to provide a link to external data within an electronic communication that the user is currently generating, the user has to retrieve the link for the external data separately and paste the link to the external data in the electronic communication. For example, to include a link to a document in a database within an instant messaging session, the user has to access the database, select the document, left mouse click, select "copy as document link", go back to the instant messaging session, and manually paste the link within the messaging session.

Presently, there is no mechanism to automatically detect that the user is interested in linking to external data and automatically pasting a link to the external data within the electronic communication for the user. Such a system is needed to enhance user efficiency. Thus, the illustrative embodiments provide for using an indexed field in a data store to automatically insert a link to external data. In response to determining that a value that entered into the electronic communication matches data stored in an index field, a link to the original data is automatically inserted into the electronic communication.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium is a computer readable storage medium. A computer readable storage medium is an electronic, magnetic, or semiconductor system, apparatus, device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer readable storage medium is any tangible medium that can store a program for use by or in connection with an instruction execution system, apparatus, or device. The terms "computer-readable tangible storage medium" and "storage medium" do not encompass a signal propagation medium, any description in this disclosure to the contrary notwithstanding.

Program code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. Java and all Java-based trademarks and logos are trademarks or registered trademarks of Oracle and/or its affiliates. The program code may execute entirely on the user's computer, partly on the user's computer, as a stand-alone software package, par on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 2:
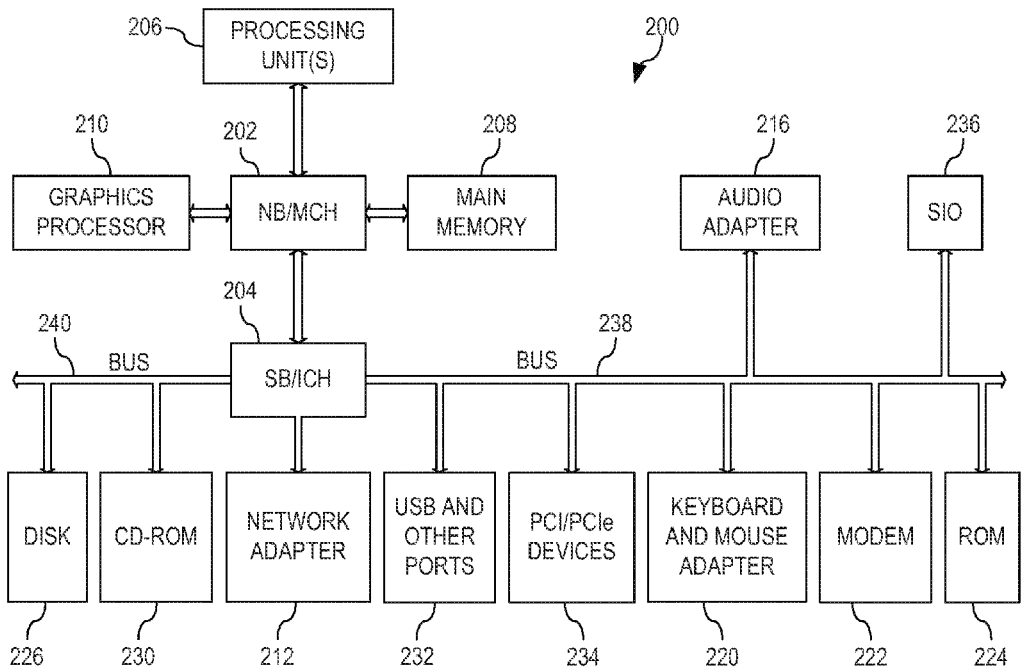
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

Client 110 may include an electronic communication application 116, which may be any type of electronic communication application, such as instant messaging, email, text editor, or the like. Client 110 may further include an automated hyperlink program 118, which is communicatively coupled to electronic communication application 116 and a storage device, such as storage device 108 or a storage device internal to client 110 (not shown). Automated hyperlink program 118 enables a user using electronic communication application 116 to automatically generate a link to external data and automatically insert the link into an electronic communication, thereby not requiring the user to manually insert the link into the electronic communication. While in FIG. 1, client 110 includes electronic communication application 116 and automated hyperlink program 118, in other embodiments, any of servers 104 and 106 and clients 110, 112, and 114 may include one or both of electronic communication application 116 and automated hyperlink program 118.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as server 104 or 106 or client 110, 112, or 114 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, universal serial bus (USB) ports and other communication ports 232, and PCI/PCIe devices 234 connect to SB/ICH 204 through bus 238. PCI/PCIe devices 234 may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204 through bus 238.

An operating system runs on processing unit 206. The operating system coordinates and provides control of various components within the data processing system 200 in FIG. 2. As a client, the operating system may be a commercially available operating system such as Microsoft® Windows 7®. Microsoft and Windows 7 are trademarks of Microsoft Corporation in the United States, other countries, or both. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Linux is a registered trademark of Linus Torvalds in the United States, other countries, or both. Data processing system 200 may be a symmetric multiprocessor (SMP) system including a plurality of processors in processing unit 206. Alternatively, a single processor system may be employed.

Program instructions for the operating system, the object-oriented programming system, and applications or programs, such as electronic communication application 116 depicted in FIG. 1 and automated hyperlink program 118 depicted in FIG. 1, are located on one or more storage devices, such as HDD 226 or CD-ROM drive 230, and may be loaded into one or more computer-readable memories, such as main memory 208 or ROM 224, for execution by processing unit 206.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
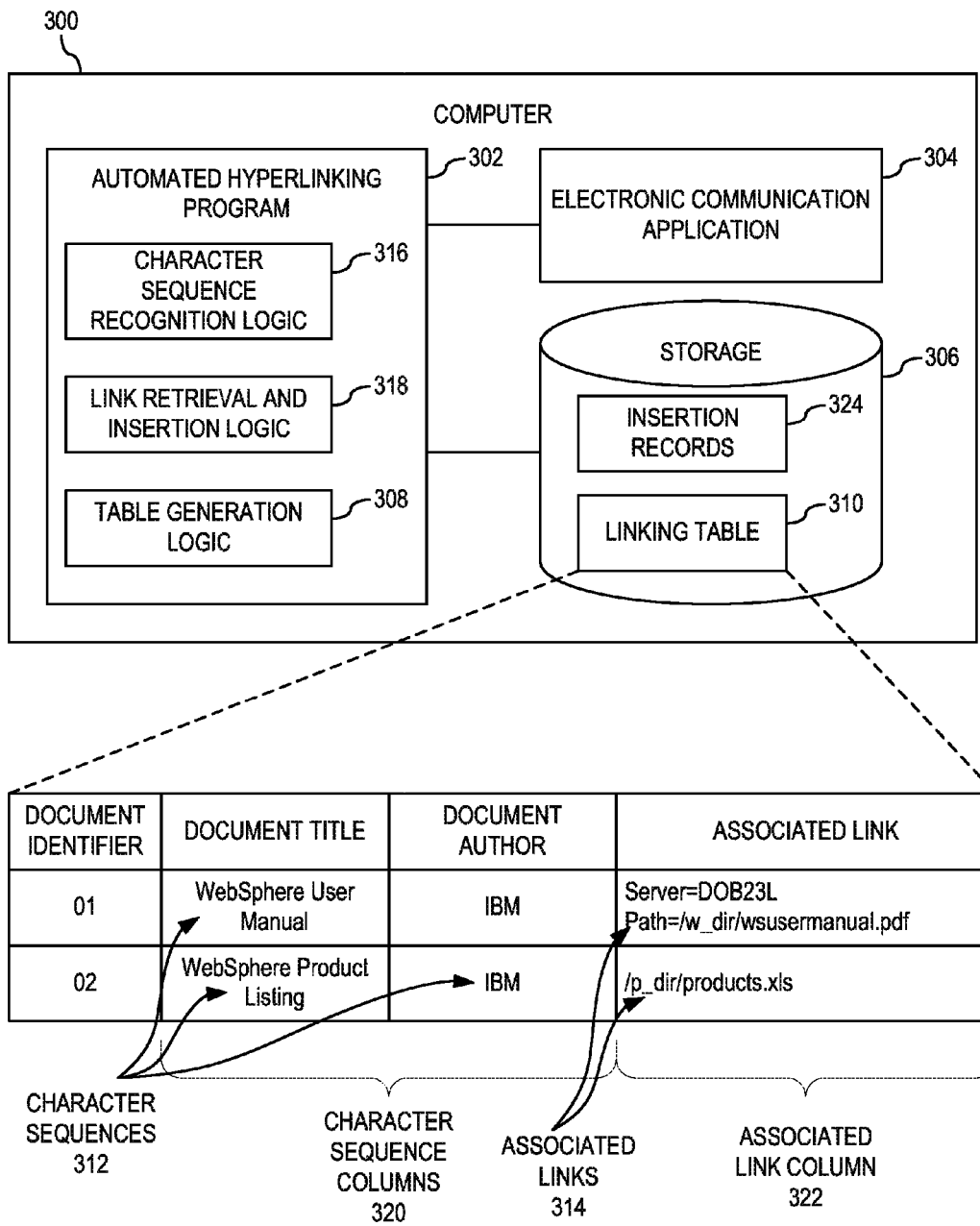
FIG. 3 depicts a functional block diagram of an automated hyperlink program in accordance with an illustrative embodiment.

Again, the illustrative embodiments enable a user using an electronic communication application to automatically generate a link to external data and automatically insert the link into an electronic communication, thereby not requiring the user to manually insert the link into the electronic communication. The electronic communication application may be any type of electronic communication application, such as instant messaging, email, text editor, or the like. As such, FIG. 3 depicts a functional block diagram of an automated hyperlink program in accordance with an illustrative embodiment. Computer 300 comprises an automated hyperlink program 302 that is communicatively coupled to both electronic communication application 304 and storage 306. Computer 300 is an example of data processing system 200 depicted in FIG. 2, and automated hyperlink program 302 and electronic communication application 304 are examples of automated hyperlink program 118 and electronic communication application 116 depicted in FIG. 1, respectively.

Table generation logic 308 within automated hyperlink program 302, when executed by a processing unit within computer 300, generates and populates linking table 310. In one embodiment, table generation logic 308 generates and populates linking table 310 by receiving user input that specifies one or more character sequences 312, which table generation logic 308 stores in the fields of character sequence columns 320 of linking table 310. That is, the user may specify character sequences pertaining to a document title, an author, a presentation forum, associated text, or the like. Table generation logic 308 designates one or more of character sequence columns 320 as searchable columns that may be used to compare with character sequences entered into electronic communication application 304, which will be described in detail below. Associated with each row in linking table 310, table generation logic 308 also receives user input that specifies an associated link 314 to external data that will be inserted into an electronic communication in the event that an associated character sequence from character sequences 312 in a particular row of linking table 310 is detected when the user generates an electronic communication. Associated links 314 may be hyperlinks that are, for example, Intranet links, Internet links, internal server links, links to locally stored documents, or the like. Additionally, one or more of associated links 314 may each refer to a dynamically generated document that is generated directly from one or more fields of linking table 310. That is, table generation logic 308 may receive user input that includes text. One or more of associated links 314 may each refer to a script in the text that, once executed, dynamically generates a document including information that would otherwise be retrieved from the Internet, Intranet, internal server, or the like. Table generation logic 308 stores each associated link 314 in a field of an associated link column 322 of linking table 310.

After table generation logic 308 populates linking table 310 with one or more character sequences 312 and associated links 314, character sequence recognition logic 316, when executed by the processing unit in computer 300, may prompt the user to specify one or more of character sequence columns 320 as the columns that should be used for character sequence comparison. From this point, character sequence recognition logic 316 scans all electronic communications generated by the user using electronic communication application 304. That is, character sequence recognition logic 316 scans all text entered into a user interface (e.g., a graphical user interface) on a display device coupled to computer 300 by the user into electronic communication application 304, either by typing the text, using automated speech recognition software, or the like, in order to detect character sequences that are similar to character sequences 312 in the one or more of character sequence columns 320 of linking table 310 specified by the user. Character sequence recognition logic 316 may also scan the text for tags, shortcut annotations, or the like, that may be entered by the user into electronic communication application 304. That is, when entering text into electronic communication application 304, the user may provide tags or shortcut text that character sequence recognition logic 316 recognizes and treats similar to character sequences 312 in the one or more of character sequence columns 320 of linking table 310 specified by the user, with the added feature of automatically replacing the tags or shortcuts with longer text strings specified by the user in linking table 310. Character sequence recognition logic 316 may scan the text as it is entered into electronic communication application 304 or when the user provides a request to character sequence recognition logic 316 that a scan is to be performed.

As character sequence recognition logic 316 scans the text, character sequence recognition logic 316 identifies character sequences in the text. The term "character sequences", as used in this disclosure, refers to sequences of characters, tags, shortcuts, and/or the like. Character sequence recognition logic 316 compares the identified character sequences to character sequences 312 in the one or more of character sequence columns 320 of linking table 310 specified by the user. Character sequence recognition logic 316 may detect an exact matching character sequence or multiple matching character sequences in the character sequences 312 in the one or more of character sequence columns 320 specified by the user. If character sequence recognition logic 316 detects an exact matching character sequence, character sequence recognition logic 316 notifies link retrieval and insertion logic 318 to insert an associated link 314 associated with the character sequence 312 in the one or more of character sequence columns 320 specified by the user that exactly matches an identified character sequence. Link retrieval and insertion logic 318, when executed by the processing unit in computer 300, then retrieves the associated link 314 associated with the character sequence 312 in the one or more of character sequence columns 320 specified by the user that exactly matches the identified character sequence and automatically inserts the associated link 314 so that the associated link is readily identifiable as being associated with the identified character sequence in the electronic communication generated in electronic communication application 304. That is, link retrieval and insertion logic 318 may insert the associated link immediately after the identified character sequence, may place a colon after the identified character sequence and then insert the associated link 314 after the colon, may insert a line return and then insert the associated link 314, or may insert the associated link by some other means that otherwise identifies the associated link 314 is associated with the identified character sequence.

If character sequence recognition logic 316 detects multiple matching character sequences in the character sequences 312 in the one or more of character sequence columns 320 of linking table 310 specified by the user, character sequence recognition logic 316 may present the multiple matching character sequences to the user so that the user may select one of the presented multiple matching character sequences. Responsive to the user selecting one of the presented multiple matching character sequences, character sequence recognition logic 316 notifies link retrieval and insertion logic 318 to insert, an associated link 314 associated with the selected one of the presented multiple matching character sequences. Link retrieval and insertion logic 318 then retrieves the associated link 314 associated with the selected one of the presented multiple matching sequences and automatically inserts the associated link 314 so that the associated link 314 is readily identifiable as being associated with the identified character sequence in the electronic communication generated in electronic communication application 304.

In instances where the associated link 314 refers to a file that is locally stored on computer 300 or stored in a manner that may not be immediately accessible to the participant to which the associated link 314 is being sent, then link retrieval and insertion logic 318 may execute a background replication process that makes the file immediately available via a shared system like the Internet or Intranet, or link retrieval and insertion logic 318 may download and encapsulate the file with the electronic communication when it is sent to the other participant so that the other participant will have access to the file. In addition, link retrieval and insertion logic 318 may secure any file sent to another participant using any currently known or future envisioned method. That is, link retrieval and insertion logic 318 may encrypt or secure files that are accessed using the associated link 314 in a fashion such that, when accessed by another participant, the file may be presented to the user as read-only, not printable, unable to be captured, or the like. In some instances, when a user is attempting to perform functions such as print, save, or the like, of secured files, the computer will notify the user of the security features associated with the file.

As previously described, if character sequence recognition logic 316 detects an exact matching character sequence in the character sequences 312 in the one or more of character sequence columns 320 specified by the user, link retrieval and insertion logic 318 automatically inserts the associated link 314 so that the associated link 314 is readily identifiable as being associated with the identified character sequence in the electronic communication generated in electronic communication application 304. However, even though the automated hyperlink program 302 is enabled by the user, there may be instances when the user does not want the inserted associated link 314 to appear in the electronic communication. In such an event, the user may simply delete the inserted associated link 314 from the electronic communication. However, in order that a new associated link that is the same as the deleted link is not inserted into the same location on a subsequent scan of the electronic communication, character sequence recognition logic 316 keeps a record of the location of the matched character sequence in the electronic communication and the associated link that was previously inserted in insertion records 324. By keeping a record of locations of character sequence matches and associated link insertions, character sequence recognition logic 316 may recognize that, when a deletion of an associated link from the electronic communication occurs, character sequence recognition logic 316 may use the location information to bypass scanning the same text again for the same associated link. Thus, character sequence recognition logic 316 may track the location of the scanned sequences of the electronic communication using coordinate information obtained from electronic communication application 304.

Moreover, if character sequence recognition logic 316 detects multiple matching character sequences in the character sequences 312 in the one or more of character sequence columns 320 of linking table 310 specified by the user, character sequence recognition logic 316 may present to the user, along with the multiple matching character sequences, a "Decline" option so that the user may indicate that no associated link should be inserted so that the associated link 314 is readily identifiable as being associated with the identified character sequence in the electronic communication generated in electronic communication application 304. However, similar to the exact match process, character sequence recognition logic 316 keeps a record of the location of the matched character sequence and the associated link that was previously inserted in insertion records 324. As such, character sequence recognition logic 316 may recognize that, when a decline of an insertion of an associated link is indicated, character sequence recognition logic 316 may use the location information to bypass scanning the same text again for the same associated link. Again, character sequence recognition logic 316 may track the location of the scanned character sequences of the electronic communication using coordinate information obtained from electronic communication application 304.

After link retrieval and insertion logic 318 inserts associated link 314 into the electronic communication, character sequence recognition logic 316 continues to scan the electronic communication for other character sequence matches. If other character sequence matches are found, character sequence recognition logic 316 notifies link retrieval and insertion logic 318 to automatically insert an associated link into the electronic communication as described above. Responsive to the user indicating that the electronic communication is complete, character sequence recognition logic 316 stops the scan of the electronic communication, and electronic communication application 304 sends the generated electronic communication, including the one or more identified character sequences and automatically inserted associated links, to a second data processing system. In a further embodiment, character sequence recognition logic 316 may also be able to identify the participants/recipients involved in the electronic communication. By being able to identify the participants/recipients of the electronic communication, character sequence recognition logic 316 is able to discern which associated links are valid for each participant/recipient. By recording the deletion of automatically inserted associated links or a decline of inserting an associated link, character sequence recognition logic 316 "learns" which associated links are valid for each participant/recipient. That is, if a user continues to delete or decline specific associated links for specific recipients, character sequence recognition logic 316 stops proposing those links to the participant/recipient.

In still a further embodiment, regardless of the participant/recipient in or of the electronic communication, character sequence recognition logic 316 may also "learn" which associated links are valid for specific conversations based on the context of the electronic communication. That is, in the scanning of the text entered into the electronic communication, character sequence recognition logic 316 may be able to discern the topic of the conversation by looking at specific words or phrases used in the electronic communication and keeping a record of those specific words or phrases for which associated link 314 was chosen by the user. For each discerned topic, character sequence recognition logic 316 may record which associated links are deleted/declined and which are inserted/selected. Then, as future electronic communications are generated, character sequence recognition logic 316 may stop proposing link suggestions that are not relevant to text included in the discerned topics in the future electronic communications.

FIG. 4 depicts an exemplary scenario of the use of an automated hyperlink program in accordance with an illustrative embodiment. In this example, based on received user input, table generation logic, such as table generation logic 308 of FIG. 3, generates linking table 400, which comprises a document identifier column 402, a document title column 404, a document author column 406, and an associated linking column 408. Document title column 404 and document author column 406 may be character sequence columns, such as character sequence columns 320 of FIG. 3, and associated linking column 408 may be an associated linking column, such as associated link column 322 of FIG. 3.

As a user enters text into electronic communication 410 in an electronic communication application, such as electronic communication application 304 of FIG. 3, character sequence recognition logic, such as character sequence recognition logic 316 of FIG. 3, scans the text to identify sequences of characters. In the process of scanning the text, the character sequence recognition logic may detect a sequence of characters that matches one or more of character sequences in a selected one or more of the character sequence columns. For example, in electronic communication 410, a first user "Anne" composes an instant message to a second user "Brian" stating "Brian, am a new member of the team and want to know which document to read first for training." Brian responds to Anne with "Start with the WebSphere User Manual." In response to Brian entering "WebSphere User Manual" into the instant message, the character sequence recognition logic identifies the character sequence "WebSphere User Manual", detects an exact match to the identified character sequence in document title column 404, and notifies link retrieval and insertion logic, such as link retrieval and insertion logic 318 of FIG. 3, to insert the associated link in associated linking column 408 associated with identified character sequence. The link retrieval and insertion logic then retrieves an associated link associated with the identified character sequence and automatically inserts the associated link so that the associated link is readily identifiable as being associated with the identified character sequence in electronic communication 410 as is illustrated by link icon 412.

Further, in electronic communication 410, Anne replies by "Thanks." Brian responds to Anne with "When you finish that, you may want to read the WebSphere Redbook." In response to Brian's entering the term "WebSphere Redbook," the character sequence recognition logic identifies the character sequence "WebSphere Redbook" and detects multiple matching character sequences to the identified character sequence in document title column 404. Responsive to detecting the multiple matching character sequences, the character sequence recognition logic may present the multiple matching character sequences to the user in pop-up window 414 so that the user may indicate a selection of one of the presented multiple matching character sequences or decline insertion of a link altogether. Responsive to the user indicating a selection of one of the presented multiple matching character sequences and clicking the "Insert" button, the character sequence recognition logic notifies the link retrieval and insertion logic to insert an associated link associated with the selected one of the presented multiple matching character sequences. The link retrieval and insertion logic then retrieves the associated link associated with the selected one of the presented multiple matching character sequences and automatically inserts the associated link no that the associated link is readily identifiable as being associated with the identified character sequence in electronic communication 410, illustrated by link icon 416. Alternatively, responsive to the user declining insertion of a link altogether, the character sequence recognition logic records the decline of the insertion of an associated link, does not insert link icon 416, and bypasses scanning the same text again.

Figure 5:
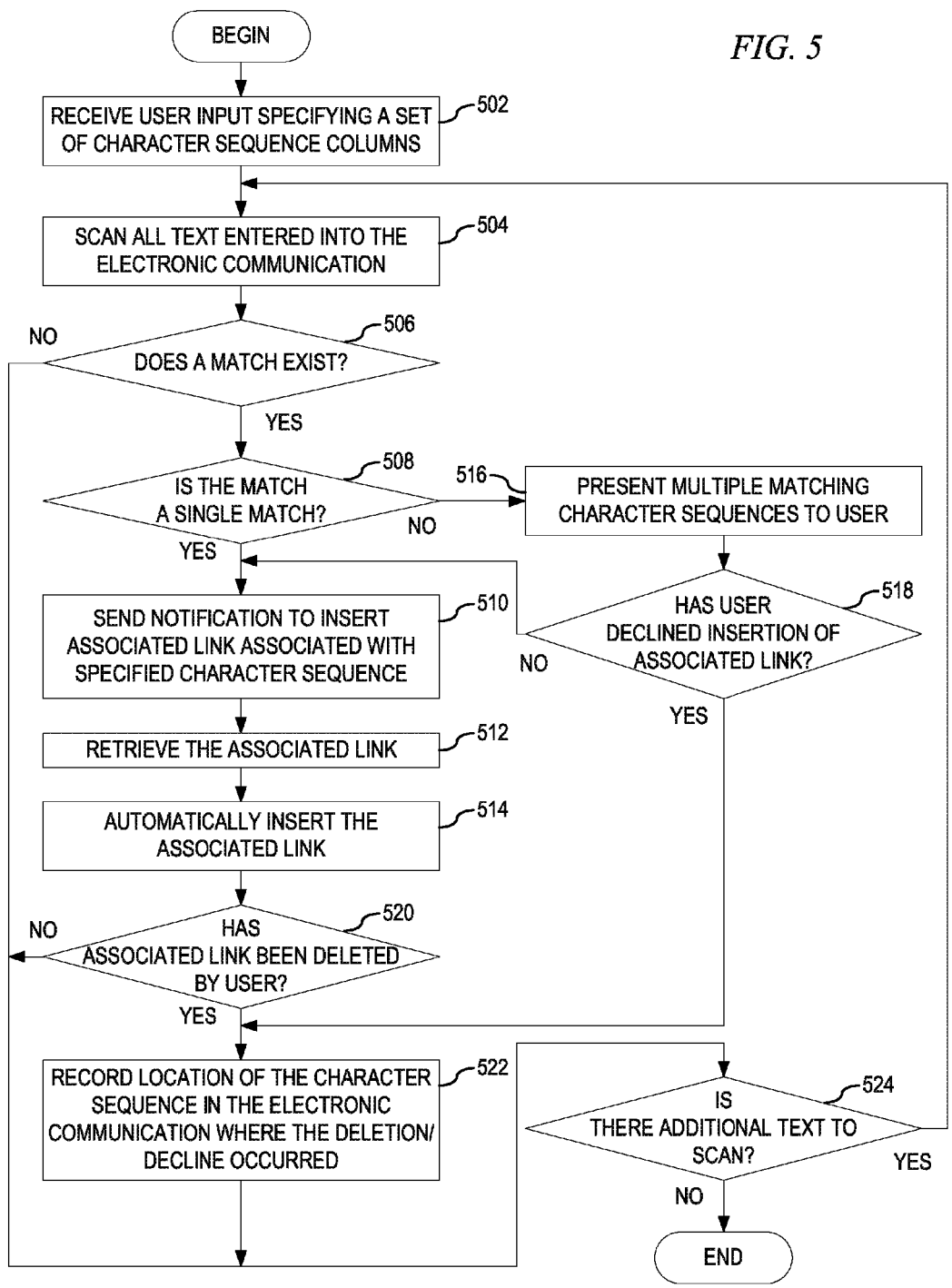
FIG. 5 depicts a flowchart of the operation performed by an automated hyperlinking program in accordance with an illustrative embodiment.

FIG. 5 depicts a flowchart of the operation performed by an automated hyperlinking program in accordance with an illustrative embodiment. The automated hyperlinking program may be, for example, automated hyperlinking program 302 depicted in FIG. 3. As the operation begins, character sequence recognition logic, such as character sequence recognition logic 316 depicted in FIG. 3, executed by a processing unit in a data processing system, receives user input specifying a set of character sequence columns in a linking table to use for character sequence comparison (step 502). As an electronic communication is generated by the user via a user interface (e.g., a graphical user interface) on a display device coupled to the data processing system, the character sequence recognition logic scans all text entered into the electronic communication (step 504) in order to detect character sequences that are similar to character sequences in the set of character sequence columns specified by the user. The character sequence recognition logic determines whether a match exists between an identified character sequence in the text entered by the user in the electronic communication and the character sequences in the set of character sequence columns identified by the user (step 506).

If at step 506 a match fails to exist, the operation proceeds to step 524. If at step 506 a match exists, the character sequence recognition logic determines whether the match is to a single character sequence in the set of character sequence columns specified by the user or to multiple character sequences in the set of character sequence columns specified by the user (step 508). If at step 508 the match is to a single character sequence, the character sequence recognition logic notifies link retrieval and insertion logic, such as link retrieval and insertion logic 318 depicted in FIG. 3, to insert an associated link associated with the single character sequence in the set of character sequence columns specified by the user (step 510). The link retrieval and insertion logic, executed by a processing unit in a data processing system, retrieves the associated link associated with the single character sequence in the set of character sequence columns specified by the user (step 512) and automatically inserts the associated link so that the associated link is readily identifiable as being associated with the identified character sequence in the electronic communication (step 514). If at step 508 the character sequence recognition logic detects multiple character sequence matches, the character sequence recognition logic presents the multiple matching character sequences to the user (step 516) so that the user may select one of the presented multiple matching character sequences. The character sequence recognition logic then determines whether the user has selected one of the presented multiple matching character sequences or declined the insertion of an associated link (step 518). If at step 518 the user selects one of the presented multiple matching character sequences, the operation proceeds to step 510. If at step 518 the user declines the insertion of an associated link, or if at step 520, an associated link that has been inserted at step 514 but then deleted by the user at step 520, character sequence recognition logic records the location of the identified character sequence in the electronic communication where the deletion/decline occurred and the associated link that was deleted or declined in an insertion record (step 522). By keeping a record of locations of character sequence matches and associated link insertions, the character sequence recognition logic recognizes that, when a deletion or decline of an associated link from the electronic communication occurs, the character sequence recognition logic may use the location information and the associated link to bypass scanning the same text again for the same associated link.

From step 520, if the user has not deleted the inserted associated link, or from step 522, where the character sequence recognition logic has recorded the location of the character sequence in the electronic communication where the deletion/decline occurred, character sequence recognition logic determines whether there is additional text to scan (step 524). In one embodiment, character sequence recognition logic determines whether there is additional text to scan based on a user indication of whether the electronic communication is complete. If at step 524, the user has made no indication, then the operation proceeds to step 504. If at step 524, the user has provided such an indication, the operation terminates.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide an improved data processing apparatus and method for using an indexed field in a data store to automatically insert a link to external data. In response to determining that a value that entered into the electronic communication matches data stored in an index field, a link to the original data is automatically inserted into the electronic communication.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The illustrative embodiments were chosen and described in order to best explain the principles of the invention, the practical application, and to enable others of ordinary skill in the art to understand the invention for various embodiments with various modifications as are suited to the particular use contemplated.

What is claimed is:

1. A method, in a computer, for automated hyperlinking, the method comprising:
    the computer receiving user input specifying a set of character sequence columns in a table to use for character sequence comparison;
    the computer detecting whether a character sequence entered into an electronic communication in a user interface on a display matches one or more character sequences in fields of the set of character sequence columns, wherein each of the one or more character sequences has an associated hyperlink in the table;
    responsive to the character sequence matching multiple character sequences of the one or more character sequences in the fields of the set of character sequence columns, the computer presenting the multiple character sequences and a decline option on the display; and
    responsive to a user selecting the decline option:
        the computer creating a record of a location of the character sequence in the electronic communication; and
        using the record, the computer bypassing scanning the character sequence at the location in the electronic communication, the bypassing preventing insertion of the hyperlink associated with an of the displayed multiple character sequences into the electronic communication at the location of the character sequence.

2. The method of claim 1, further comprising the steps of:
    the computer detecting whether a second character sequence entered into the electronic communication matches one or more second character sequences in fields of the set of character sequence columns;
    responsive to the second character sequence matching multiple second character sequences of the one or more second character sequences, the computer presenting the multiple second character sequences on the display; and
    responsive to receiving a selection of a character sequence of the displayed multiple second character sequences:
        the computer retrieving, from an associated link field in the table, the hyperlink associated with the selected character sequence; and
        the computer inserting the hyperlink associated with the selected character sequence into the electronic communication.

3. The method of claim 2, wherein the associated link field is in an associated link column of the table and in a row of the table comprising the selected character sequence.

4. The method of claim 2, wherein the method further comprises:
the computer detecting a deletion of the hyperlink associated with the selected character sequence in the electronic communication;
the computer creating a record of a location of the selected character sequence in the electronic communication; and
using the record of the location of the selected character sequence in the electronic communication, the computer bypassing scanning the selected character sequence at the location of the selected character sequence in the electronic communication, the bypassing preventing insertion of the hyperlink associated with the selected character sequence into the electronic communication at the location of the selected character sequence.

5. The method of claim 2, further comprising the step of:
after the step of the computer inserting the hyperlink associated with the selected character sequence into the electronic communication, the computer sending the electronic communication to a second computer.

6. The method of claim 1, wherein the computer detecting whether the character sequence entered into the electronic communication in the user interface on the display matches one or more character sequences in the fields of the set of character sequence columns comprises:
the computer scanning text entered into the electronic communication; and
the computer comparing the text entered into the electronic communication to the one or more character sequences from the fields of the set of character sequence columns.

7. A computer program product for automated hyperlinking, the computer program product comprising:
one or more computer-readable tangible storage devices;
program instructions, stored on at least one of the one or more computer-readable tangible storage devices, to receive user input specifying a set of character sequence columns in a table to use for character sequence comparison;
program instructions, stored on at least one of the one or more computer-readable tangible storage devices, to detect whether a character sequence entered into an electronic communication in a user interface on a display matches one or more character sequences in fields of the set of character sequence columns, wherein each of the one or more character sequences has an associated hyperlink in the table;
program instructions, stored on at least one of the one or more computer-readable tangible storage devices, to, responsive to the character sequence matching multiple character sequences of the one or more character sequences in the fields of the set of character sequence columns, present the multiple character sequences and a decline option on the display; and
program instructions, stored on at least one of the one or more computer-readable tangible storage devices, to, responsive to a user selecting the decline option:
create a record of a location of the character sequence in the electronic communication; and
using the record, bypass scanning the character sequence at the location in the electronic communication, wherein the program instructions to bypass prevent insertion of the hyperlink associated with any of the displayed multiple character sequences into the electronic communication at the location of the character sequence.

8. The computer program product of claim 7, further comprising:
program instructions, stored on at least one of the one or more computer-readable tangible storage devices, to detect whether a second character sequence entered into the electronic communication matches one or more second character sequences in fields of the set of character sequence columns;
program instructions, stored on at least one of the one or more computer-readable tangible storage devices, to present multiple second character sequences on the display in response to the second character sequence matching the multiple second character sequences of the one or more second character sequences; and
program instructions, stored on at least one of the one or more computer-readable tangible storage devices, to, in response to receiving a selection of a character sequence of the displayed multiple second character sequences:
retrieve, from an associated link field in the table, the hyperlink associated with the selected character sequence; and
insert the hyperlink associated with the selected character sequence into the electronic communication.

9. The computer program product of claim 8, wherein the associated link field is in an associated link column of the table and in a row of the table comprising the selected character sequence.

10. The computer program product of claim 8, further comprising:
program instructions, stored on at least one of the one or more computer-readable tangible storage devices, to detect a deletion of the hyperlink associated with the selected character sequence in the electronic communication;
program instructions, stored on at least one of the one or more computer-readable tangible storage devices, to create a record of a location of the selected character sequence in the electronic communication; and
program instructions, stored on at least one of the one or more computer-readable tangible storage devices, to, using the record of the location of the selected character sequence in the electronic communication, bypass scanning the selected character sequence at the location of the selected character sequence in the electronic communication, wherein the program instructions to bypass prevent insertion of the hyperlink associated with the selected character sequence into the electronic communication at the location of the selected character sequence.

11. The computer program product of claim 8, further comprising:
program instructions, stored on at least one of the one or more computer-readable tangible storage devices, to send the electronic communication to a computer after inserting the hyperlink associated with the selected character sequence into the electronic communication.

12. The computer program product of claim 7, wherein the program instructions to detect whether the character sequence entered into the electronic communication in the user interface on the display matches one or more character sequences in the fields of the set of character sequence columns comprise:
program instructions to scan text entered into the electronic communication; and program instructions to compare the text entered into the electronic communication to the one or more character sequences from the fields of the set of character sequence columns.

13. A computer system for automated hyperlinking, the computer system comprising:
- one or more processors, one or more computer-readable memories, one or more computer-readable tangible storage devices;
- program instructions, stored on at least one of the one or more computer-readable tangible storage devices for execution by at least one of the one or more processors via at least one of the one or more memories, to receive user input specifying a set of character sequence columns in a table to use for character sequence comparison;
- program instructions, stored on at least one of the one or more computer-readable tangible storage devices for execution by at least one of the one or more processors via at least one of the one or more memories, to detect whether a character sequence entered into an electronic communication in a user interface on a display matches one or more character sequences in fields of the set of character sequence columns, wherein each of the one or more character sequences has an associated hyperlink in the table;
- program instructions, stored on at least one of the one or more computer-readable tangible storage devices for execution by at least one of the one or more processors via at least one of the one or more memories, to, responsive to the character sequence matching multiple character sequences of the one or more character sequences in the fields of the set of character sequence columns, presenting the multiple character sequences and a decline option on the display; and
- program instructions, stored on at least one of the one or more computer-readable tangible storage devices for execution by at least one of the one or more processors via at least one of the one or more memories, to, responsive to a user selecting the decline option;
  - create a record of location of the character sequence in the electronic communication; and
  - using the record, bypass scanning the character sequence at the location in the electronic communication, wherein the program instructions to bypass prevent insertion of the hyperlink associated with any of the displayed multiple character sequences into the electronic communication at the location of the character sequence.

14. The computer system of claim 13, further comprising:
program instructions, stored on at least one of the one or more computer-readable tangible storage devices for execution by at least one of the one or more processors via at least one of the one or more memories, to detect whether a second character sequence entered into the electronic communication matches one or more second character sequences in fields of the set of character sequence columns;
program instructions, stored on at least one of the one or more computer-readable tangible storage devices for execution by at least one of the one or more processors via at least one of the one or more memories, to present multiple second character sequences on the display in response to the second character sequence matching the multiple second character sequences of the one or more second character sequences; and
program instructions, stored on at least one of the one or more computer-readable tangible storage devices for execution by at least one of the one or more processors via at least one of the one or more memories, to, in response to receiving a selection of a character sequence of the displayed multiple second character sequences:
- retrieve, from an associated link field in the table, the hyperlink associated with the selected character sequence; and
- insert the hyperlink associated with the selected character sequence into the electronic communication.

15. The computer system of claim 14, wherein the associated link field is in an associated linking column of the table and in a row of the table comprising the selected character sequence.

16. The computer system of claim 14, further comprising:
program instructions, stored on at least one of the one or more computer-readable tangible storage devices for execution by at least one of the one or more processors via at least one of the one or more memories, to detect a deletion of the hyperlink associated with the selected character sequence in the electronic communication;
program instructions, stored on at least one of the one or more computer-readable tangible storage devices for execution by at least one of the one or more processors via at least one of the one or more memories, to create a record of a location of the selected character sequence in the electronic communication; and
program instructions, stored on at least one of the one or more computer-readable tangible storage devices for execution by at least one of the one or more processors via at least one of the one or more memories, to, using the record of the location of the selected character sequence in the electronic communication, bypass scanning the selected character sequence at the location of the selected character sequence in the electronic communication, wherein the program instructions to bypass prevent insertion of the hyperlink associated with the selected character sequence into the electronic communication at the location of the selected character sequence.

17. The computer system of claim 14, further comprising:
program instructions, stored on at least one of the one or more computer-readable tangible storage devices for execution by at least one of the one or more processors via at least one of the one or more memories, to send the electronic communication to a computer after inserting the hyperlink associated with the selected character sequence into the electronic communication.

18. The computer system of claim 13, wherein the program instructions to detect whether the character sequence entered into the electronic communication in the user interface on the display matches one or more character sequences in the fields of the set of character sequence columns further comprise:
program instructions to scan text entered into the electronic communication; and
program instructions to compare the text entered into the electronic communication to the one or more character sequences from the fields of the set of character sequence columns.

* * * * *